(12) United States Patent
Zheng et al.

(10) Patent No.: US 9,799,111 B2
(45) Date of Patent: Oct. 24, 2017

(54) METHODS AND SYSTEMS FOR HIGHLIGHTING BOX SURFACES AND EDGES IN MOBILE BOX DIMENSIONING

(71) Applicant: SYMBOL TECHNOLOGIES, LLC, Lincolnshire, IL (US)

(72) Inventors: Hao Zheng, Centereach, NY (US); Zhiheng Jia, Plantation, FL (US); David S. Koch, East Islip, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 113 days.

(21) Appl. No.: 15/041,713

(22) Filed: Feb. 11, 2016

(65) Prior Publication Data
US 2017/0236265 A1   Aug. 17, 2017

(51) Int. Cl.
*G06T 7/00* (2017.01)
*G06F 3/0481* (2013.01)
(Continued)

(52) U.S. Cl.
CPC ........ *G06T 7/0004* (2013.01); *G06F 3/04815* (2013.01); *G06K 9/4604* (2013.01); *G06K 9/4652* (2013.01); *G06K 9/52* (2013.01); *G06K 9/6215* (2013.01); *G06T 7/0051* (2013.01); *G06T 7/0081* (2013.01); *G06T 7/0085* (2013.01); *G06T 7/11* (2017.01); *G06T 7/13* (2017.01); *G06T 7/408* (2013.01); *G06T 7/50* (2017.01); *G06T 7/60* (2013.01); *G06T 7/602* (2013.01); *G06T 7/62* (2017.01); *G06T 7/90* (2017.01); *G06T 11/60* (2013.01);
(Continued)

(58) Field of Classification Search
CPC ..... G06T 7/11; G06T 7/50; G06T 7/60; G06T 7/62; G06T 15/005; G06T 19/20; G06T 2200/04; G06K 9/00201; G06K 9/4604
See application file for complete search history.

(56) References Cited

U.S. PATENT DOCUMENTS 9,053,547 B2   6/2015   Kitamura et al. .... G06T 7/0046
2002/0025074 A1   2/2002   Wilhelm ...................... 382/203
(Continued)

OTHER PUBLICATIONS

International Search Report & Written Opinion for corresponding International Patent Application No. PCT/US2016/067509 dated Mar. 8, 2017.
(Continued)

*Primary Examiner* — Andrew W Johns
(74) *Attorney, Agent, or Firm* — Yuri Astvatsaturov (57) ABSTRACT

Disclosed herein are methods and systems for highlighting box surfaces and edges in mobile box dimensioning. An embodiment takes the form of a method that includes obtaining a three-dimensional (3D) point cloud from a depth sensor when the depth sensor is positioned such that an aiming indicator appears on a first surface of an object; processing the 3D point cloud to identify an extent of the first surface; further processing the 3D point cloud to identify a second surface that is adjacent and normal to the first surface, and to identify an extent of the second surface; and displaying at least part of the 3D point cloud via a user interface, including displaying the identified first surface in a first color and the identified second surface in a second color different from the first color.

20 Claims, 9 Drawing Sheets

(51) Int. Cl.
- *G06T 7/60* (2017.01)
- *G06T 19/20* (2011.01)
- *G06T 15/00* (2011.01)
- *G06T 7/40* (2017.01)
- *G06K 9/46* (2006.01)
- *G06K 9/62* (2006.01)
- *G06K 9/52* (2006.01)
- *G06T 11/60* (2006.01)
- *G06T 7/50* (2017.01)
- *G06T 7/90* (2017.01)
- *G06T 7/62* (2017.01)
- *G06T 7/11* (2017.01)
- *G06T 7/13* (2017.01)

(52) U.S. Cl.
CPC ............ *G06T 15/005* (2013.01); *G06T 19/20* (2013.01); *G06T 2200/04* (2013.01); *G06T 2207/10028* (2013.01); *G06T 2207/20112* (2013.01); *G06T 2207/30108* (2013.01)

(56) References Cited

U.S. PATENT DOCUMENTS

| | | | |
|---|---|---|---|
| 2004/0118919 A1 | 6/2004 | Breytman et al. | 235/454 |
| 2009/0160852 A1 | 6/2009 | Chang et al. | 345/419 |
| 2013/0293539 A1 | 11/2013 | Hunt et al. | 345/420 |
| 2016/0012269 A1 | 1/2016 | Kowalczyk et al. | G06K 7/146 |
| 2016/0196659 A1* | 7/2016 | Vrcelj et al. | G06T 7/0081 382/154 |
| 2017/0124726 A1* | 5/2017 | Soulard et al. | G06T 7/602 |

OTHER PUBLICATIONS

Karpathy, "Object Discovery in 3D Scenes Via Shape Analysis," IEEE International Conference on Robotics and Automation, pp. 2088-2095 (May 6-10, 2013) [retrieved on Oct. 13, 2013].

Izadi et al., "KinectFusion: Real-Time 3D Reconstruction and Interaction Using a Moving Depth Camera," Proceedings of the 24th Annual ACM Symposium on User Interface Software and Technology, pp. 559-568 (Oct. 16, 2011) [retrieved from Internet on Nov. 28, 2013: http://research.microsoft.com/pubs/155416/kinectfusion-uist-comp.pdf].

Skotheim et al., "A Flexible 3D Object Localization System for Industrial Part Handling", IEEE/RSJ International Conference on Intelligent Robots and Systems, pp. 3326-3333 (Oct. 7, 2012).

Poppinga et al., "Fast Plane Detection and Polygonalization in Noisy 3D Range Images," IEEE/RSJ International Conference on Intelligent Robots and Systems, pp. 3378-3383 (Sep. 22, 2008).

* cited by examiner

METHODS AND SYSTEMS FOR HIGHLIGHTING BOX SURFACES AND EDGES IN MOBILE BOX DIMENSIONING

BACKGROUND OF THE INVENTION

Accurate measurements of packages prior to shipping is an important task in the transportation and logistics industry. It is advantageous for users to have the ability to measure the size of a package or packages from an image that also includes background data (e.g., other objects). This may prove difficult while viewing an image in a graphical user interface ("GUI"). In determining the package size, it is difficult to distinguish package images from the background image in a GUI. A good differentiation of package images and background image is important to the accurate measurement of package sizes. Accordingly, there is a need for methods and systems for highlighting box surfaces and edges in mobile box dimensioning.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed herein are methods and systems for highlighting box surfaces and edges in mobile box dimensioning.

One embodiment takes the form of a method that includes (a) obtaining a three-dimensional (3D) point cloud from a depth sensor when the depth sensor is positioned such that an aiming indicator appears on a first surface of an object, (b) processing the 3D point cloud to identify an extent of the first surface, (c) further processing the 3D point cloud to identify a second surface that is adjacent and normal to the first surface, and to identify an extent of the second surface, and (d) displaying at least part of the 3D point cloud via a user interface, wherein displaying at least part of the 3D point cloud comprises displaying the identified first surface in a first color and the identified second surface in a second color different from the first color.

A second embodiment takes the form of a system that includes a user interface, a depth sensor, a processor, and a data storage containing instructions executable by the processor for causing the system to carry out at least the functions described in the preceding paragraph.

In at least one embodiment, the depth sensor and the user interface are both components of a single handheld device.

In at least one embodiment, the aiming indicator appearing on the first surface of the object includes the aiming indicator appearing in the user interface to be positioned on the first surface of the object.

In at least one embodiment, the aiming indicator is shaped like a square.

In at least one embodiment, the aiming indicator is shaped like crosshairs.

In at least one embodiment, the aiming indicator appearing on the first surface of the object includes the aiming indicator being actually projected on to the first surface of the object.

In at least one embodiment, the aiming indicator appears at an aiming-indicator location on the first surface, and identifying the extent of the first surface includes (i) calculating an aiming-indicator unit normal vector at the aiming-indicator location; and (ii) identifying the extent of the first surface to be a first-surface set of points in the 3D point cloud, where the first-surface set is contiguous and includes the aiming-indicator location, and where each point in the first-surface set has a respective unit normal vector that is equal to the aiming-indicator unit normal vector.

In at least one embodiment, identifying the second surface includes (i) identifying a second-surface point that (a) is adjacent to the first surface and (b) has a second-surface-point unit normal vector that is normal to the aiming-indicator unit normal vector; and (ii) identifying a surface that includes the second-surface point as being the second surface.

In at least one embodiment, identifying the extent of the second surface includes identifying the extent of the second surface to be a second-surface set of points in the 3D point cloud, where the second-surface set is contiguous and includes the second-surface point, and where each point in the second-surface set has a respective unit normal vector that is equal to the second-surface-point unit normal vector.

In at least one embodiment, identifying the second surface includes (i) identifying a first edge of the first surface, (ii) identifying multiple candidate second surfaces, (iii) identifying the at least one edge of at least one of the identified candidate second surfaces, and (iv) identifying the second surface to be a candidate second surface that has an edge that is coextensive with the identified first edge of the first surface.

In at least one embodiment, one of the first and second colors is orange and the other of the first and second colors is either blue or green.

In at least one embodiment, the method further includes identifying at least two edges from among the identified first and second surfaces, and displaying at least part of the 3D point cloud includes displaying the at least two identified edges in a third color different from both the first and second colors.

In at least one embodiment, each of the first, second, and third colors has a mutual high-contrast relationship with each of the other two of the first, second, and third colors.

In at least one embodiment, the at least two edges from among the identified first and second surfaces includes two first-surface edges and one second-surface edge that all connect at a common corner of the object.

In at least one embodiment, the third color is yellow.

In at least one embodiment, one of the first and second colors is orange and the other of the first and second colors is either blue or green.

In at least one embodiment, the first and second colors have a mutual high-contrast relationship.

In at least one embodiment, displaying a given surface in a given color includes displaying the extent of the given surface in the given color.

In at least one embodiment, the method further includes, while displaying, via the user interface, the identified first surface in the first color and the identified second surface in the second color, receiving a data-capture command via the user interface, and responsively storing volumetric data characteristic of the object.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

Figure 1:
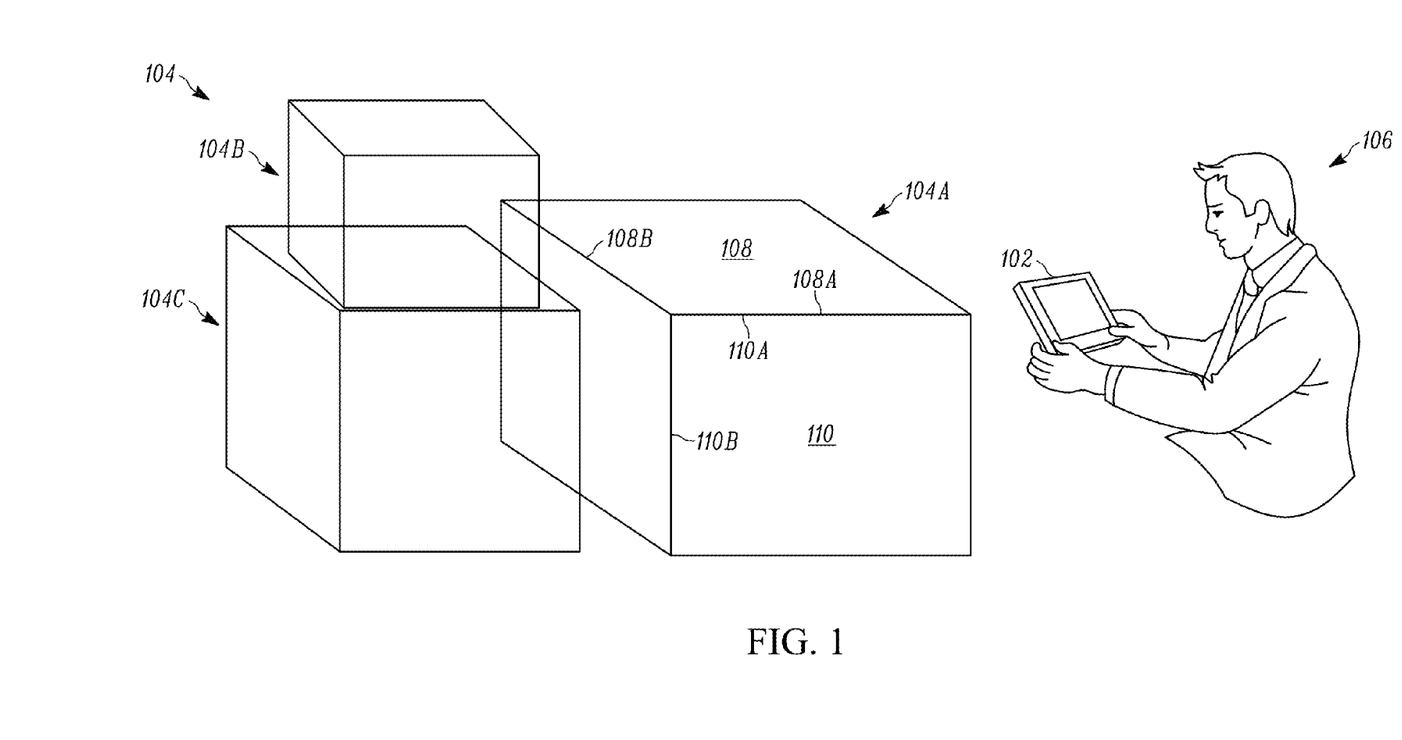
FIG. 1 depicts an example scenario that includes several example packages, as well as a user holding an example handheld computing device, in accordance with some embodiments.

FIG. 1 depicts an example scenario that includes several example packages, as well as a user holding an example handheld computing device, in accordance with some embodiments. In particular, FIG. 1 depicts a handheld device 102, packages 104, and a user 106. The packages 104 are substantially cubic in shape (i.e., each side of each package 104 is substantially rectangular (e.g., square) in shape) and could have any number of different sizes as depicted by examples 104A, 104B, and 104C. Also labeled in FIG. 1 are a top surface 108 and a front surface 110 of the package 104A, as well as (i) a first edge 108A and a second edge 108B of the top surface 108A and (ii) a first edge 110A and a second edge 110B of the front surface 110. In the depicted example scenario, the front surface 110 of the package 104A is facing the user 106.

The user 106 may position the handheld device 102 such that the handheld device 102 is aimed generally toward the packages 104 and directed to a surface of a package. In the depicted and described example, the user 106 positions the handheld device 102 such that the handheld device 102 (and in particular an aiming indicator of the handheld device 102) is aimed at a first surface 108 (i.e., the top surface in the example scenario that is depicted in FIG. 1) of the package 104A. This is by way of example and not limitation, as the user 106 could aim the handheld device 102 at any surface of any package.

Figure 2:
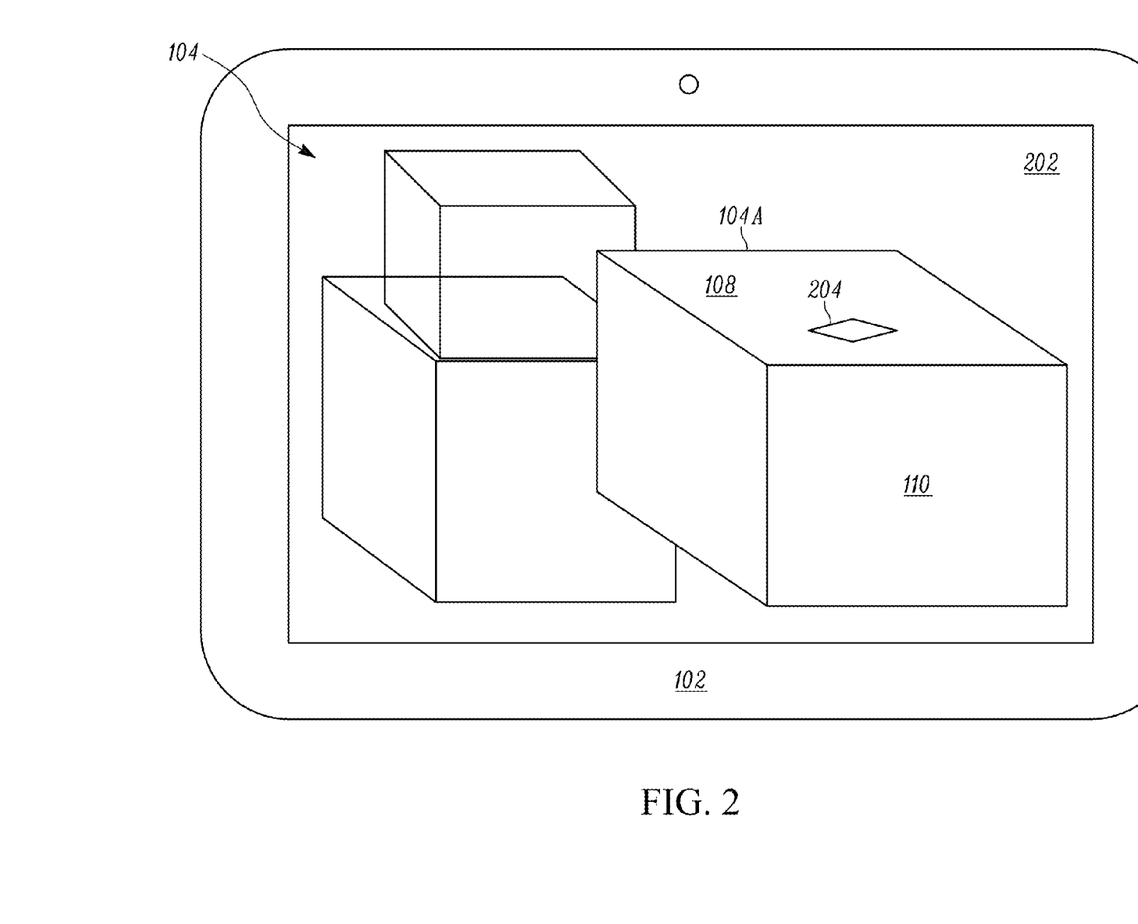
FIG. 2 depicts a first example front view of the computing device of FIG. 1, in accordance with some embodiments.

FIG. 2 depicts a first example front view of the computing device of FIG. 1 in accordance with some embodiments. In particular, FIG. 2 depicts the handheld device 102 as having a touchscreen 202 and an aiming indicator 204. In FIG. 2, the aiming indicator 204 is displayed on the touchscreen 202 such that it looks to the user 106 like the aiming indicator 204 appears on the top surface 108 of the package 104A. In some embodiments, the aiming indicator 204 includes a light beam (e.g., laser beam) that is actually projected from the handheld device 102 on to a surface of a package. Either way, in operation, it appears to the user viewing the touchscreen 202 of the handheld device 102 that the aiming indicator 204 appears on a surface of a package (when properly aimed). As stated, in the depicted and described example, the aiming indicator 204 appears to be on the top surface 108 of the package 104A.

Figure 3:
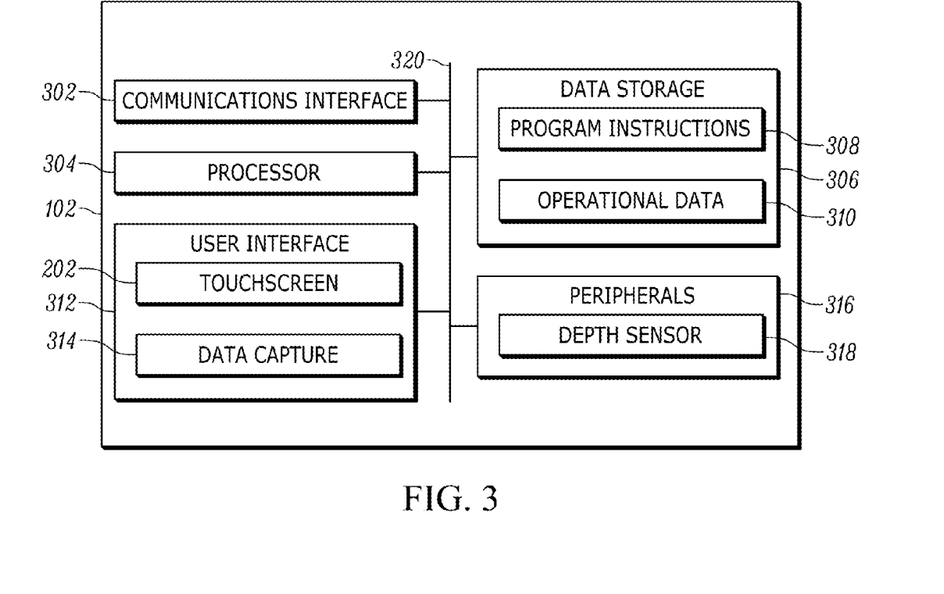
FIG. 3 depicts an example architectural view of the computing device of FIG. 1, in accordance with some embodiments.

FIG. 3 depicts an architectural view of the example computing device of FIG. 1, in accordance with some embodiments. The handheld device 102 may be configured to carry out the functions described herein, and as depicted includes a communications interface 302, a processor 304, data storage 306 (that contains program instructions 308 and operational data 310), a user interface 312 (that contains the touchscreen 202 and a data-capture element 314), peripherals 316 (that contains a depth sensor 318), and a communication bus 320. This arrangement is presented by way of example and not limitation, as other example arrangements could be described here.

The communication interface 302 may be configured to be operable for communication according to one or more wireless-communication protocols, some examples of which include LMR, LTE, APCO P25, ETSI DMR, TETRA, Wi-Fi, Bluetooth, and the like. The communication interface 302 may also or instead include one or more wired-communication interfaces (for communication according to, e.g., Ethernet, USB, and/or one or more other protocols). The communication interface 302 may include any necessary hardware (e.g., chipsets, antennas, Ethernet interfaces, etc.), any necessary firmware, and any necessary software for conducting one or more forms of communication with one or more other entities as described herein.

The processor 304 may include one or more processors of any type deemed suitable by those of skill in the relevant art, some examples including a general-purpose microprocessor and a dedicated digital signal processor (DSP).

The data storage 306 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, the data storage 306 contains program instructions 308 executable by the processor 304 for carrying out various functions described herein, and further is depicted as containing operational data 310, which may include any one or more data values stored by and/or accessed by the handheld device 102 in carrying out one or more of the functions described herein. In at least one embodiment, the handheld device 102 contains a matrix laboratory (MATLAB) program instruction 308. And certainly other examples could be listed.

The user interface 312 may include one or more input devices (a.k.a. components and the like) and/or one or more output devices (a.k.a. components and the like.) With respect to input devices, the user interface 312 may include one or more touchscreens, buttons, switches, microphones, and the like. With respect to output devices, the user interface 312 may include one or more displays, speakers, light emitting diodes (LEDs), and the like. Moreover, one or more components (e.g., an interactive touchscreen and display) of the user interface 312 could provide both user-input and user-output functionality. As depicted in FIG. 3, the user interface 312 contains the touchscreen 202 and the data-capture element 314. Other handheld-device user-interface components could also be present, as known to those of skill in the art.

The peripherals 316 may include any handheld device 102 accessory, component, or the like, that is accessible to and useable by the handheld device 102 during operation. As depicted in FIG. 3, the peripherals 316 contains the depth sensor 318. There are a number of types depth sensors 318 that could be used, perhaps one that includes an RGB sensor, perhaps leap motion, perhaps Intel perceptual computing, perhaps Microsoft Kinect, among numerous other possibilities that could be listed here. There are also a number of depth-sensing techniques that could be implemented by the depth sensor 318, perhaps using stereo triangulation, perhaps using time of flight, perhaps using coded aperture, among numerous other possibilities that could be listed here. That set of information (i.e., points) is referred to herein as being a 3D point cloud (or at times simply a point cloud); each point in such a cloud corresponds to the perceived packages 104 at a corresponding location in the field of view of the depth sensor 318.

Figure 4:
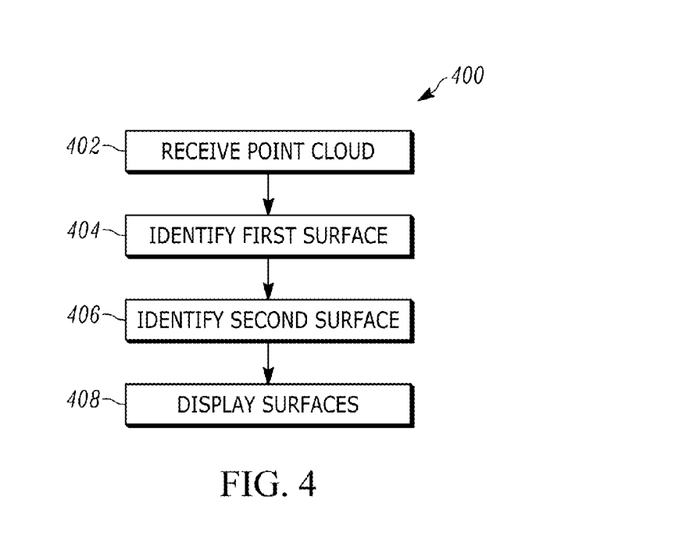
FIG. 4 depicts an example method, in accordance with some embodiments.

FIG. 4 depicts an example method, in accordance with some embodiments. In particular, FIG. 4 depicts a method 400 that includes steps 402, 404, 406 and 408, and is described below by way of example as being carried out by the handheld device 102, though in general the method 400 could be carried out by any computing device that is suitably equipped, programmed, and configured.

At step 402, the handheld device 102 obtains a 3D point cloud using the depth sensor 318 at a time when the handheld device 102 is positioned such that the aiming indicator 204 appears on the top surface 108 of the package 104A. The 3D point cloud includes a plurality of points that each have a respective normal vector. The aiming indicator 204 appearing on the top surface 108 of the package 104A appears in the user interface 202. The aiming indicator 204 may appear in the user interface 202 in several different ways. In one embodiment, the aiming indicator 204 is shaped like a square or crosshairs. In another embodiment, the aiming indicator 204 is projected on the first surface of the package 104A. And certainly other example implementations are possible.

Figure 5:
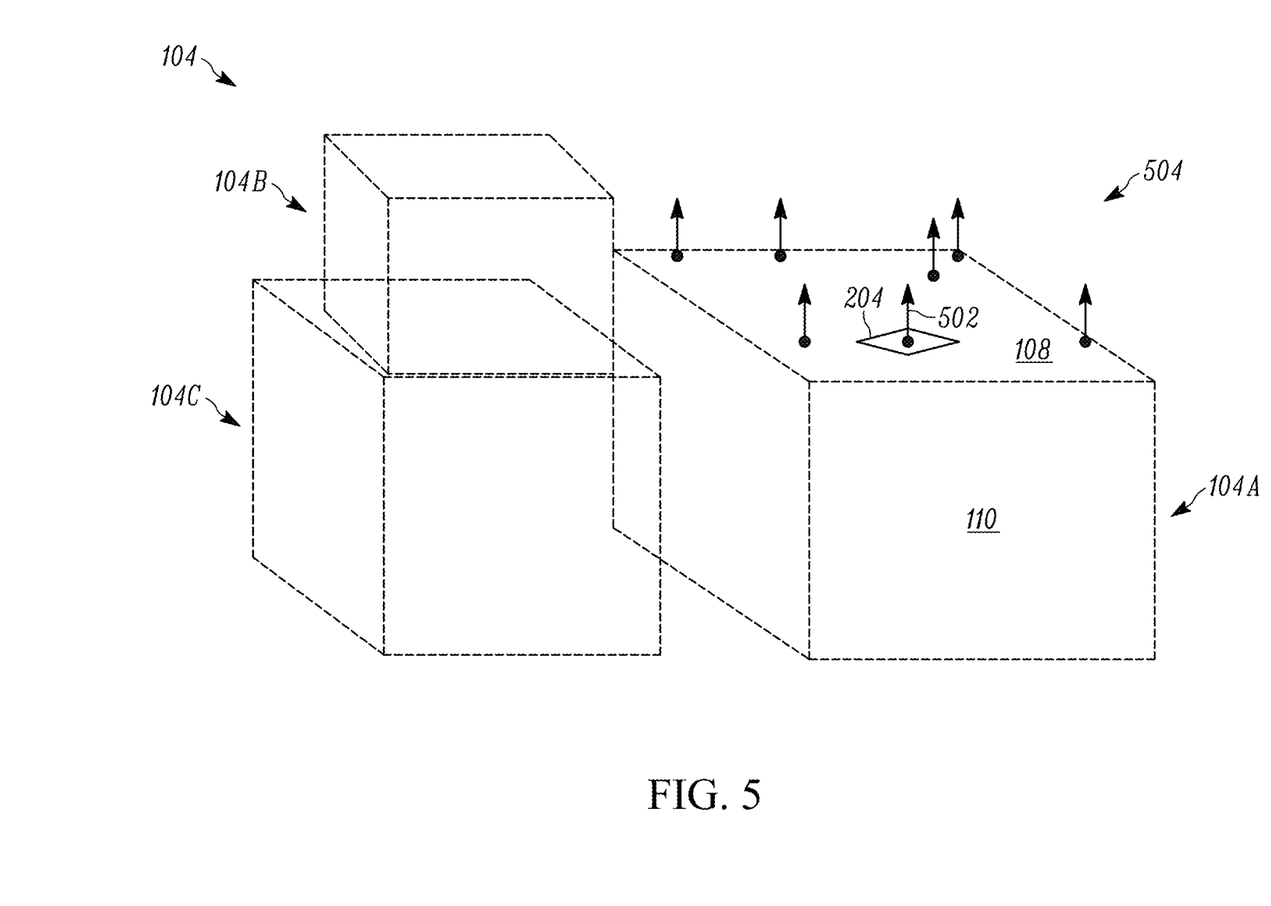
FIG. 5 depicts a first outline view of the example packages of FIG. 1, in accordance with some embodiments.

At step 404, the handheld device 102 processes the 3D point cloud to identify an extent of the first surface of the package 104A. The handheld device 102 may do so by first calculating an aiming-indicator unit normal vector as depicted in FIG. 5. In this instance and elsewhere in this disclosure, the term unit normal vector is used to refer to a normal vector having a unit (i.e., default, standard, etc.) length, to facilitate comparisons of various unit normal vectors to one another in a context where the orientation (i.e., direction) of such normal vectors is what matters, and where the magnitude of such normal vectors is not particularly relevant.

A normal vector is a local geometric property of a 3D surface and specific to a given point. It should be clear to those skilled in the art that a reliable estimation of the normal vector at a given point within a point cloud data set is thus dependent on the identification of the given point's neighboring points. There are a number of different ways the handheld device 102 may identify the normal vector's neighboring points and calculate the normal vector at a point within the 3D point cloud. In at least one embodiment, the handheld device 102 uses a fixed number of Euclidean nearest neighboring points to estimate the normal vector at a given point within the 3D point cloud. In another embodiment, the handheld device 102 identifies the normal vector's neighboring point by constructing a polygonal mesh to identify the neighboring points according to the connected polygonal facets. The handheld device 102 then calculates the normal vector by fitting the identified neighboring points to a plane and using the fitted plane's normal as the normal vector. And certainly other example implementations are possible. In some embodiments, the handheld device 102 uses a library-provided function to compute the normal vector of a surface at a given point. One example is the "surfnorm" function provided by MATLAB.

FIG. 5 depicts a first outline view of the example packages of FIG. 1, in accordance with some embodiments. In particular, FIG. 5 depicts an outline of the packages 104. The outline is intended to generally correspond to the packages 104 that are depicted in FIG. 1, in order to help the reader visualize an example real-world scenario from which the example 3D point cloud could have been derived, gathered, or the like. Moreover, for purposes of illustration, various points in the 3D point cloud are shown in FIG. 5 as having respective unit normal vectors that correspond to the top surface 108 of the package 104A. In actual implementations, any number of unit normal vectors could be calculated, as the various unit normal vectors that are depicted in FIG. 5 are for illustration and are not meant to be comprehensive.

As shown in FIG. 5, the aiming indicator 204, an aiming-indicator unit normal vector 502, and a first-surface set of unit normal vectors 504 are shown. The aiming-indicator unit normal vector 502 is a normal vector corresponding to a point representative of the aiming indicator's 204 location on the package 104A.

Returning to FIG. 4 at step 404, as to how the handheld device 102 may identify an extent of the top surface 108 of package 104A, in at least one embodiment, the handheld device 102 identifies the extent of the top surface 108 to be a first-surface set of points that have respective unit normal vectors 504 that are equal to the aiming-indicator unit normal vector 502 in the 3D point cloud, where that first-surface set of points is contiguous and includes the point at which the aiming-indicator unit normal vector 502 originates from the top surface 108 of the package 104A. Given that the top surface 108 of the package 104A may not be completely flat, in at least one embodiment, two unit normal vectors may be considered equal to one another if their directions are within a threshold tolerance of one another. And certainly other example implementations are possible.

At step 406, the handheld device 102 further processes the 3D point cloud to identify a second surface—in this case the front surface 110 of the package 104A. In at least one embodiment, the handheld device 102 may do so by first calculating a second-surface point unit normal vector as depicted in FIG. 6.

Figure 6:
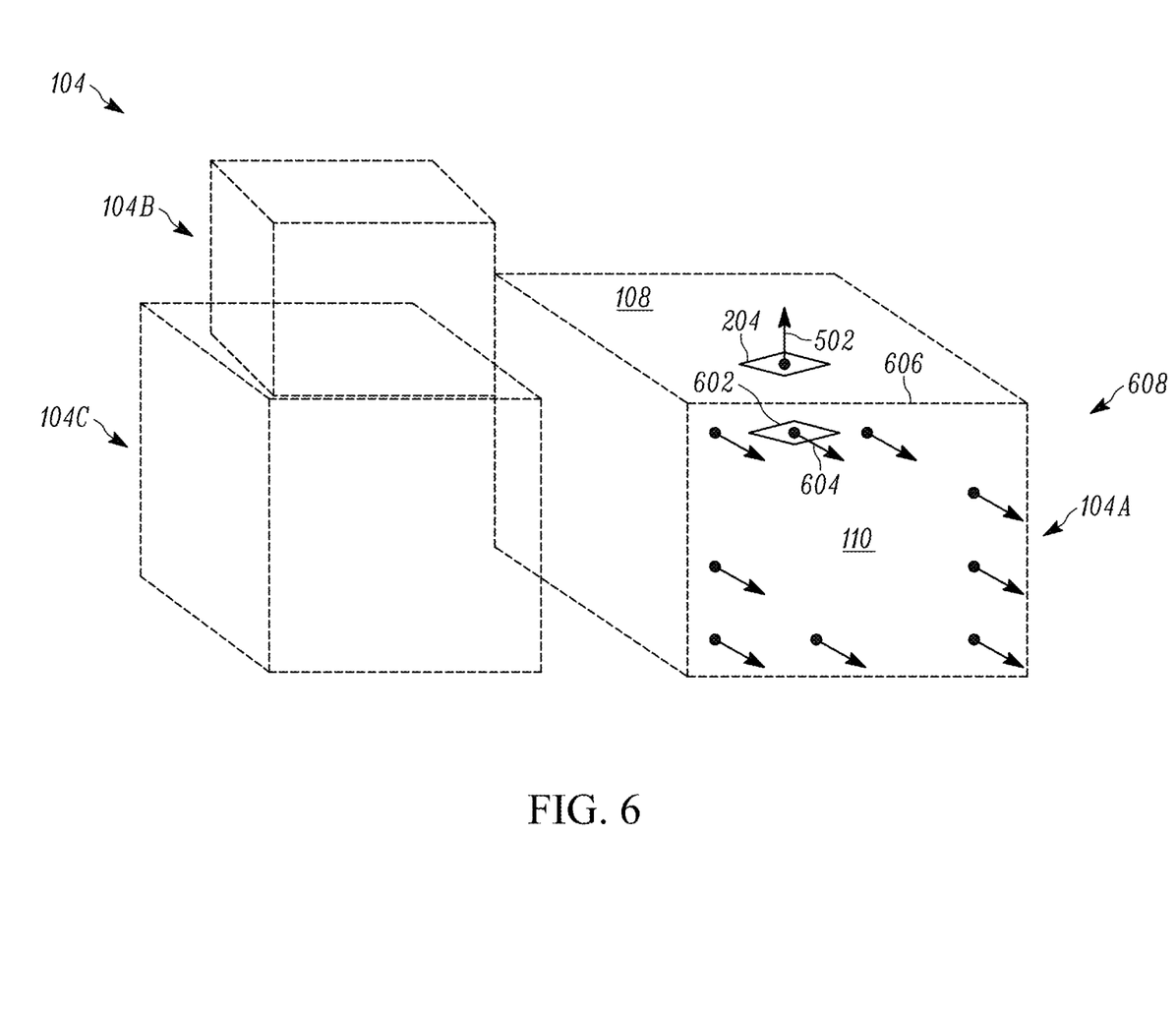
FIG. 6 depicts a second outline view of the example packages of FIG. 1, in accordance with some embodiments.

FIG. 6 depicts a second outline view of the example packages of FIG. 1, in accordance with some embodiments. In particular, FIG. 6 depicts the outline of the packages 104, the aiming-indicator unit normal vector 502, the top surface 108, a first-surface edge 606, the front surface 110, a second-surface point 602, a second-surface-point unit normal vector 604, and a second-surface set of unit normal vectors 608. The second-surface point 602 is a point on the second surface 110. The second-surface-point unit normal vector 604 is a normal vector corresponding to the second-surface point 602. Further, the front surface 110 is adjacent and normal to the top surface 108 of the package 104A. The second-surface set of unit normal vectors 608 represents the extent of the second surface 110 of the package 104A.

Thus, in operation, the handheld device 102 may calculate the aiming-indicator unit normal vector 502 at the point at which the aiming indicator 204 appears on the surface at which user has opted to aim the aiming indicator 204. In the parlance of this disclosure, that surface is called the first surface. In the depicted and described example, the first surface is the top surface 108 of the package 104A. Thus, the aiming-indicator unit normal vector 502 establishes the unit normal vector for all points on the top surface 108. The handheld device 102 then determines the extent of the top surface 108 by proceeding in various different directions in the point-cloud data, at each point calculating the unit normal vector of the surface at that point. If, at a given point, the unit normal vector matches (e.g., is close enough to) the aiming-indicator unit normal vector 502, the handheld device 102 considers that given point to be still part of the top surface 108, and proceeds outward to the next point.

Once the handheld device 102 gets to a point at which the calculated unit normal vector does not equal (e.g., is not close enough to) the aiming-indicator unit normal vector 502, the handheld device determines that it has reached an edge of the top surface 108. In various different embodiments, the handheld device 102 may require a certain number of points in a row or a certain fraction of the past certain number of points to have an unequal unit normal vector in order to determine that an edge of the top surface 108 has been reached. This may guard against anomalous data being over-interpreted as being an edge.

Once the handheld device 102 has done this analysis in enough directions to identify the four edges of the top surface 108, the handheld device may then go looking past one of those edges to try to identify a second surface that is both adjacent to and normal to the already identified first surface. In ideal cases, such a second surface would be visually confirmed by the user as also being a surface of the package 104A in which the user 106 is interested, though it could just as well be a surface of a file cabinet or a wall or another package or the like against which the package 104A is sitting. In the depicted and described example, the second surface is indeed another surface of the package 104A; in this case, it is the front surface 110 of the package 104A.

The handheld device 102 may go looking for the second surface by proceeding to points in the point cloud that are on the other side (from the aiming-indicator point) of a now-identified edge of the top surface 108 of the package 104A. In FIG. 6, it can be seen that a front edge 606 of the top surface 108 has been identified. The handheld device 102 may proceed beyond that edge 606, still calculating unit normal vectors at each point as it goes, until it reaches a point (such as the point 602) that has a unit normal vector 604 that is perpendicular to the aiming-indicator unit normal vector 502. The handheld device 102 may then follow a similar process as described above to proceed in multiple different directions to identify the extent of the second surface. The extent of the second surface (i.e., the front surface 110 of the package 104A) is graphically represented in FIG. 6 as the set 608 of unit normal vectors.

In some embodiments, the handheld device 102 will not deem a given surface to be "the second surface" as that term is used herein unless that given surface shares an edge with an identified edge of the first surface. Thus, if the handheld device 102 was initially calculating unit normal vectors on a surface that was adjacent and normal to the first surface but did not share an edge (i.e., itself have an edge that is coextensive with an identified edge of the top surface 108), the handheld device 102 would reject that surface and move on to another surface that is both adjacent and normal to the first surface, and check whether that next surface shares an edge with the top surface 108. Thus, while the front surface 110 shares the edge 606 with the top surface 108, some examples of surfaces that would be adjacent and normal to the top surface 108 but not share an edge with the top surface 108 include walls, floors, sides of filing cabinets, sides of other differently sized boxes, etc. In an embodiment, for two surfaces to share an edge, an edge of one surface has to be coextensive with an edge of the other surface. And certainly other example implementations are possible.

Returning to FIG. 4, at step 408, the handheld device 102 displays at least part of the 3D point cloud via the touchscreen 202, wherein displaying at least part of the 3D point cloud includes the handheld device 102 displaying the identified top surface 108 of the package 104A in a first color and the identified front surface 110 of the package 104A in a second color different from the first color.

The handheld device 102 may display the identified top surface 108 of the package 104A in any number of colors. Similarly, the handheld device 102 may display the identified front surface 110 of the package 104A in any number of colors. However, the top surface 108 of the package 104A and the front surface 110 of the package 104A are displayed in different colors. In at least one embodiment, the handheld device 102 displays, via the touchscreen 202, the top surface 108 of the package 104A in an orange color and the front surface 110 of the package 104A in a blue color. In another embodiment, the handheld device 102 displays, via the touchscreen 102, the top surface 108 of the package 104A in a red color and the front surface 110 of the package 104A in a purple color. And certainly other example implementations are possible.

Figure 7:
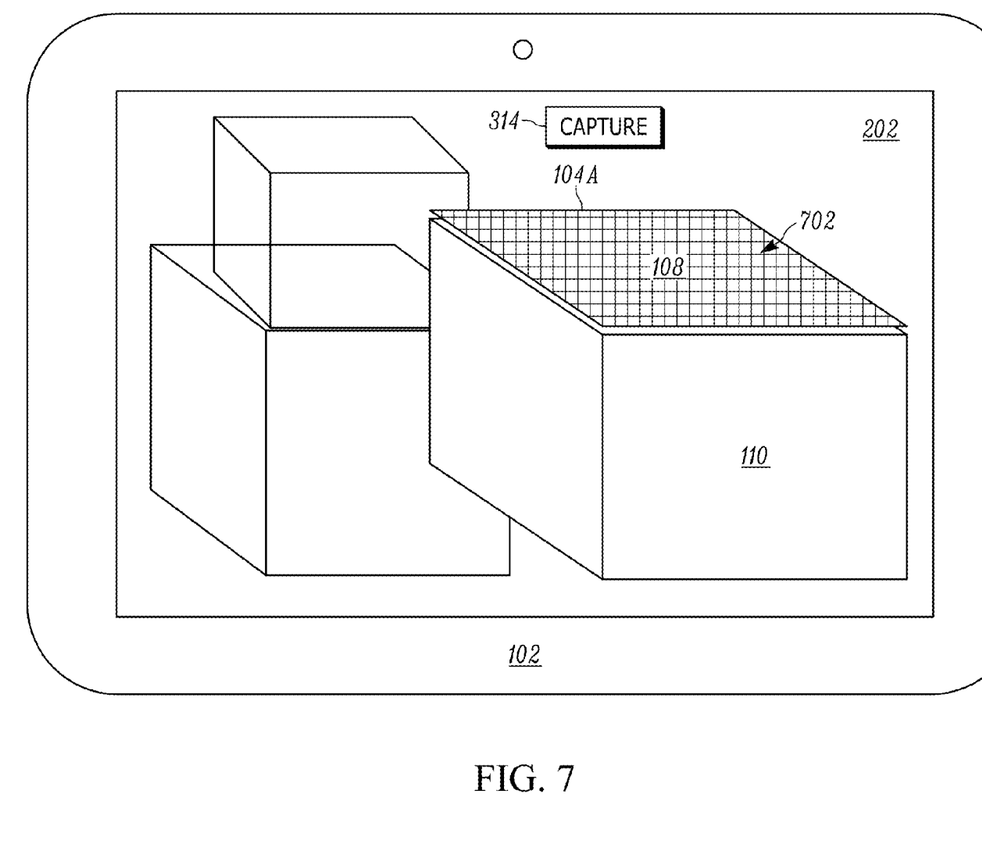
FIG. 7 depicts a second example front view of the computing device of FIG. 1, in accordance with some embodiments.

FIG. 7 depicts a second example front view of the computing device of FIG. 1 in accordance with some embodiments. In particular, FIG. 7 depicts the handheld device 102, which includes the touchscreen 202, which is currently depicting the data-capture element 314, the package 104A, which includes the top surface 108 (displayed in a top-surface color 702) and the front surface 110. The top-surface color 702 is depicted as a square-grid pattern on the top surface 108 of the package 104A. The square-grid pattern is intended to generally correspond to the top-surface color 702 on the top surface 108 of the package 104A in order to help the reader visualize an example real-world scenario. It is further noted that, in some embodiments, the handheld device 102 displaying a given surface in a given color takes the form of the handheld device 102 displaying part of the given surface in the given color; in other embodiments, the handheld device 102 displaying a given surface in a given color takes the form of the handheld device 102 displaying the full extent of the given surface in the given color.

Figure 8:
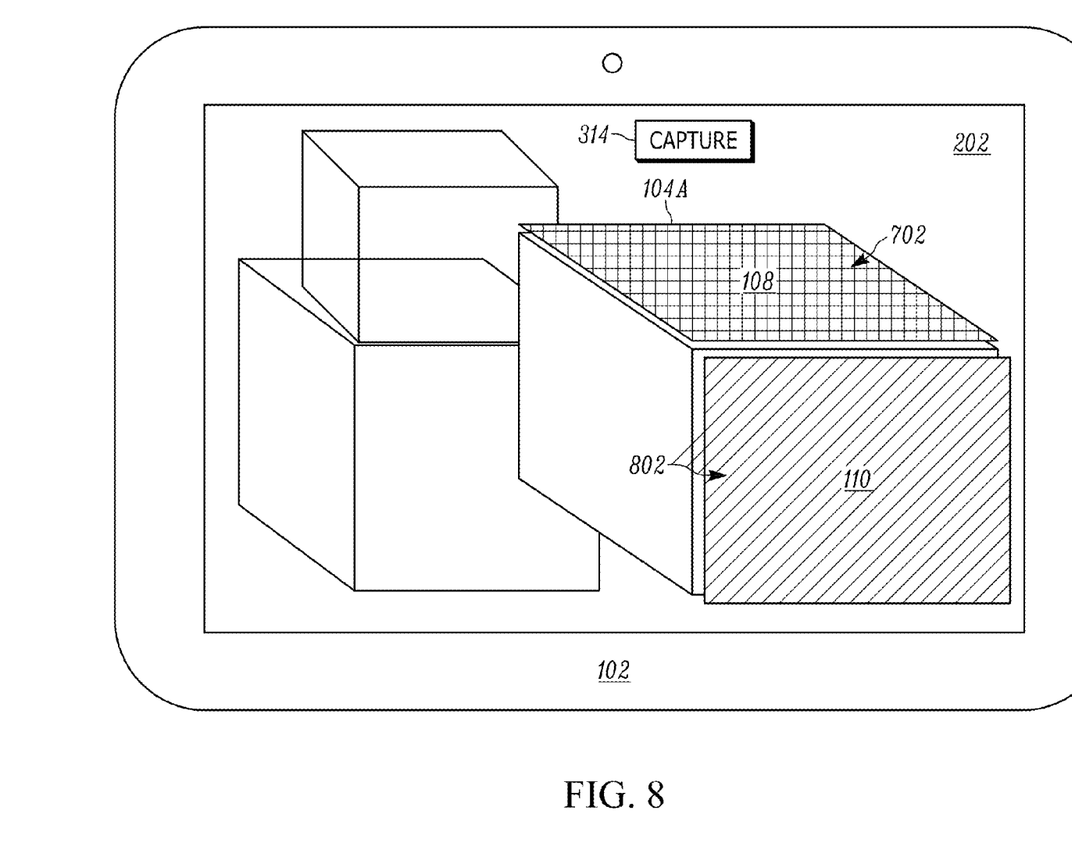
FIG. 8 depicts a third example front view of the computing device of FIG. 1, in accordance with some embodiments.

FIG. 8 depicts a third example front view of the computing device of FIG. 1 in accordance with some embodiments. In particular, FIG. 8 depicts all of the aspects that are displayed in FIG. 7, and additionally depicts the front surface 110 of the package 104A being displayed in a front-surface color 802. The front-surface color 802 is depicted as a diagonal-grid pattern on the front surface 110 of the package 104A. The diagonal-grid pattern is intended to generally correspond to the front-surface color 802 on the front surface 110 in order to help the reader visualize an example real-world scenario. It is noted that two different geometric patterns are used for depicting the top-surface color 702 and the front-surface color 802 to emphasize that these two colors 702 and 802 are different from one another. In at least one embodiment, the colors 702 and 802 have a mutual high-contrast relationship (e.g., orange and green) with one another.

In some embodiments, the handheld device 102 also identifies at least two edges from among the edges of the top surface 108 and the front surface 110. In such at least some such embodiments, when displaying at least part of the 3D point cloud, the handheld device 102 displays the at least two identified edges of the package 104A in a third color different from both the top-surface color 702 and the front-surface color 802. In at least one such embodiment, the third color has a mutual high-contrast relationship with both the top-surface color 702 and the front-surface color 802. In one embodiment, the third color is yellow (e.g., a bright, highlighter-type yellow).

Figure 9:
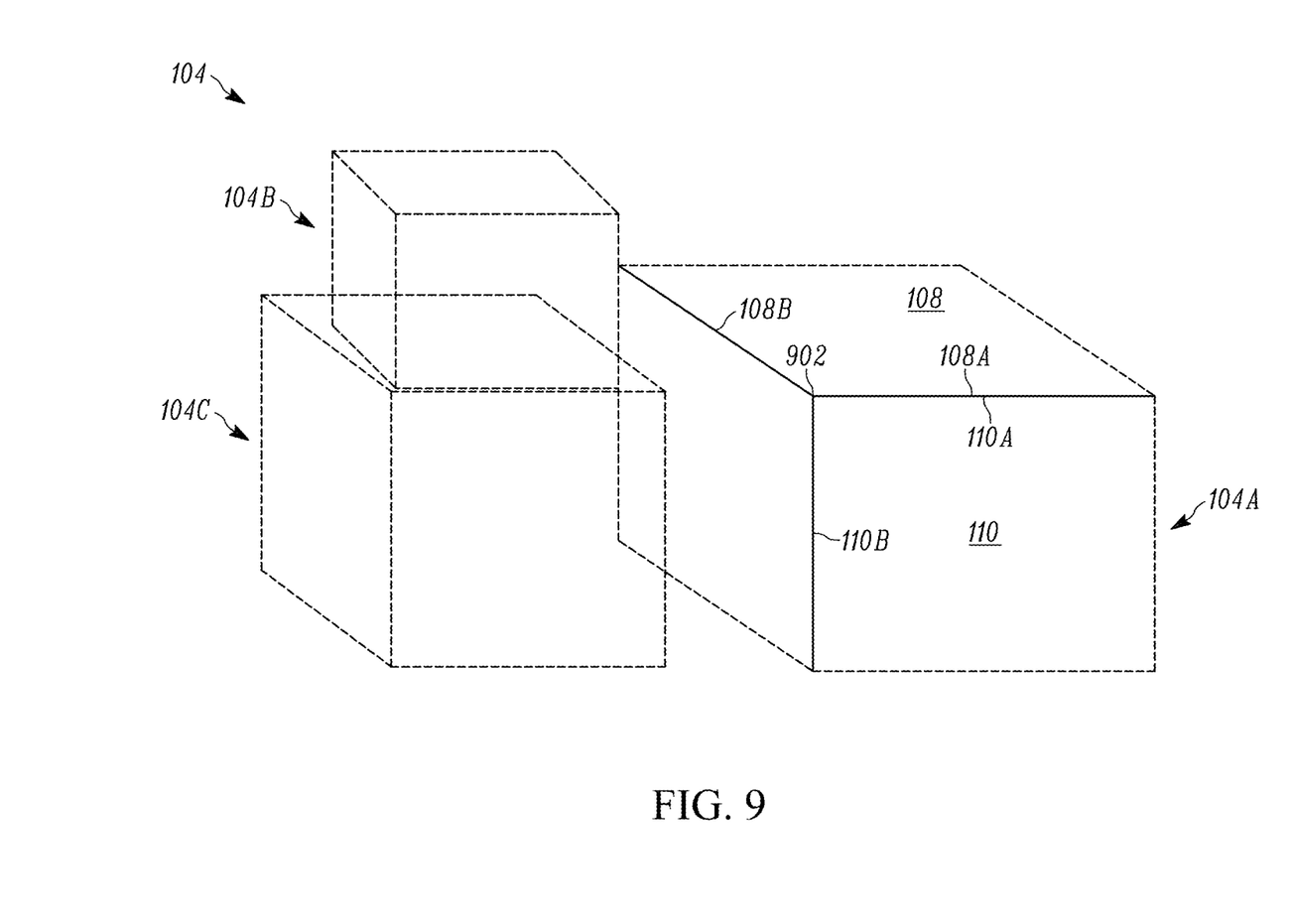
FIG. 9 depicts a third outline view of the example packages of FIG. 1, in accordance with some embodiments.

FIG. 9 depicts a third outline view of the example packages of FIG. 1, in accordance with some embodiments. In particular, FIG. 9 depicts the outline of the packages 104, the package 104A, the top surface 108, the first edge of the top surface 108A, the second edge of the top surface 108B, the front surface 110, the first edge of the front surface 110A, the second edge of the front surface 110B, the aiming-indicator unit normal vector 502, the second-surface point 602, the second-surface-point unit normal vector 604, and a common-corner point 902.

As described above, in at least one embodiment, once the handheld device 102 gets to a point at which the calculated unit normal vector does not equal (e.g., is not close enough to) the aiming-indicator unit normal vector 502, the handheld device 102 identifies at least two edges of the top surface 108 by determining that it has reached the first edge of the top surface 108A. After further analysis in enough directions, the handheld device 102 identifies the second edge of the top surface 108B.

Further, as described above, in at least one embodiment, the handheld device 102 identifies the front surface 110 by proceeding to points in the point cloud that are on the other side (from the aiming-indicator point) of the first edge of the top surface 108A of the package 104A. The handheld device 102 proceeds beyond the first edge of the top surface 108A of the package 104A, still calculating unit normal vectors at each point as it goes, until it reaches a point (such as the point 602) that has the second-surface-point unit normal vector 604 that is perpendicular to the aiming-indicator unit normal vector 502. The handheld device 102 then follows a similar process as described above to proceed in multiple different directions to identify the first edge of the front surface 110A and the second edge of the front surface 110B. In an embodiment, the handheld device 102 identifies that the edges 108A (which is also 110A), 108B, and 110B connect to one another at the common-corner point 902 of the package 104A.

The handheld device 102 may display at least two identified edges of the package 104A in any number of third colors. However, three different colors are used for (i) the at least two identified edges of the package 104A, (ii) the top surface 108 of the package 104A, and (iii) the front surface 110 of the package 104A, respectively. For example, in one embodiment, the handheld device 102 displays, via the touchscreen 202, (i) the edges 108A/110A, 108B, and 110B in a green color; (ii) the top surface 108 of the package 104A in an orange color, and (iii) the front surface 110 of the package 104A in a blue color. And certainly other example implementations are possible.

Figure 10:
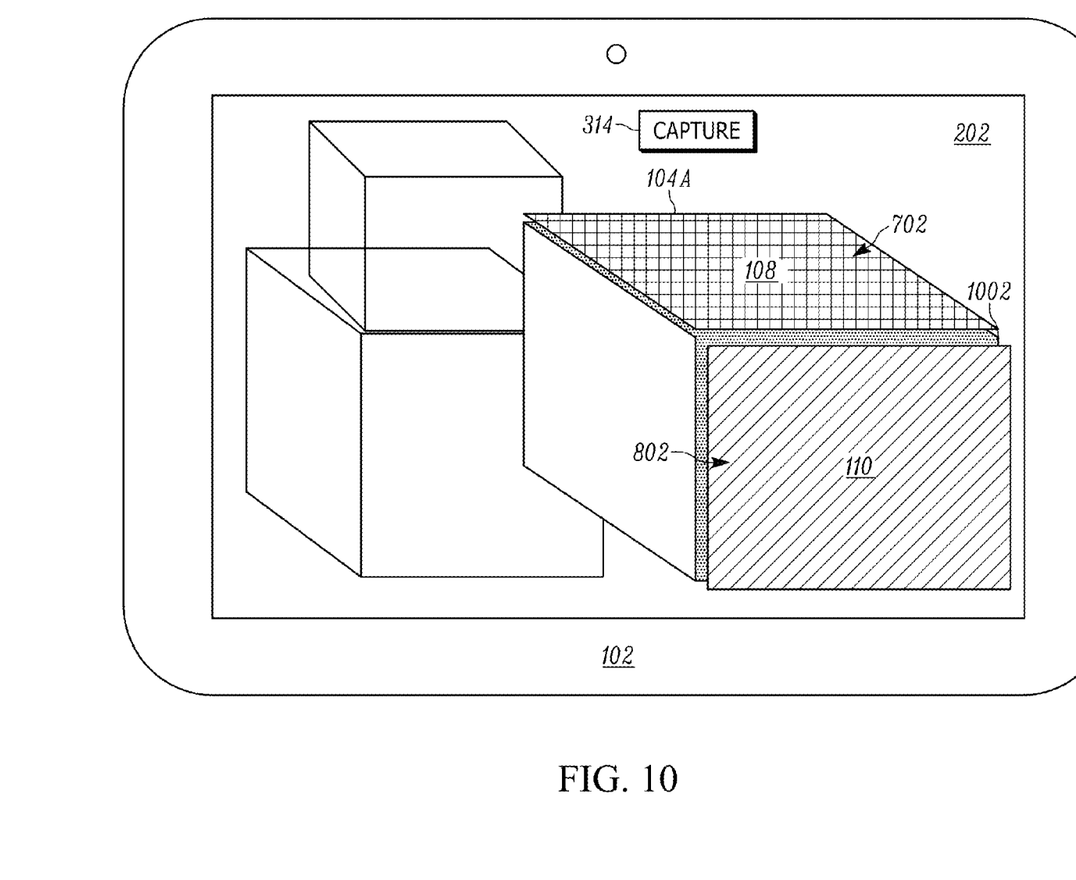
FIG. 10 depicts a fourth example front view of the computing device of FIG. 1, in accordance with some embodiments.

FIG. 10 depicts a fourth example front view of the computing device of FIG. 1 in accordance with some embodiments. In particular, FIG. 10 depicts the handheld device 102, the touchscreen 202, the data-capture element 314, the package 104A, the first surface 108, the first-surface color 702, the second surface 110, the second-surface color 802, and a third-edge color 1002.

The third-edge color 1002 is depicted as a dotted pattern on each of the edges 108A/110A, 108B, and 110B of the package 104A. The dotted pattern is intended to generally correspond to the third edge color 1002 in order to help the reader visualize an example real-world scenario.

In some embodiments, the handheld device 102, while displaying the at least part of the 3D point cloud with the identified surfaces and edges highlighted in three different colors, may receive via the user interface (e.g., via the touchscreen 202) a data-capture command. In some embodiments, this takes the form of detecting an actuation of the data-capture element (e.g., soft button) 314 that is displayed in FIG. 10.

In an example situation, the user may actuate the data-capture element 314 upon concluding that the two highlighted surfaces (108 and 110) are both on the package that the user 106 is interested in (i.e., at which the user 106 aimed the aiming indicator 204). It is noted that in cases where the handheld device 102 highlights the top surface 108 and also a second surface that is not part of the package 104A, the user may try again, change angle, move the package 104A so that it is not near anything else, and/or take one or more other actions.

Upon detecting actuation of the data-capture element 314, the handheld device 102 may responsively capture and store volumetric data that is characteristic of the package 104. This volumetric data could include various dimensions (e.g., length, width, depth) of the package 104. This volumetric data could include a computed volume of the package 104. And certainly other example implementations are possible.

In some embodiments, the handheld device 102 performs a cost calculation based on a computed volume, in order to charge a customer. In some embodiments, the handheld device 102 communicates the volumetric data and/or one or more values (e.g., a shipping cost) derived therefrom to one or more other networked computing systems (e.g., a package workflow tracking system). And certainly other example implementations are possible.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    obtaining a three-dimensional (3D) point cloud from a depth sensor when the depth sensor is positioned such that an aiming indicator appears on a first surface of an object;
    processing the 3D point cloud to identify an extent of the first surface;
    further processing the 3D point cloud to identify a second surface that is adjacent and normal to the first surface, and to identify an extent of the second surface; and
    displaying at least part of the 3D point cloud via a user interface, wherein displaying at least part of the 3D point cloud comprises displaying the identified first surface in a first color and the identified second surface in a second color different from the first color.

2. The method of claim 1, wherein the depth sensor and the user interface are both components of a single handheld device.

3. The method of claim 1, wherein the aiming indicator appearing on the first surface of the object comprises the aiming indicator appearing in the user interface to be positioned on the first surface of the object.

4. The method of claim 3, wherein the aiming indicator is shaped like a square.

5. The method of claim 3, wherein the aiming indicator is shaped like crosshairs.

6. The method of claim 1, wherein the aiming indicator appearing on the first surface of the object comprises the aiming indicator being actually projected on to the first surface of the object.

7. The method of claim 1, wherein the aiming indicator appears at an aiming-indicator location on the first surface, and wherein identifying the extent of the first surface comprises:
    calculating an aiming-indicator unit normal vector at the aiming-indicator location; and
    identifying the extent of the first surface to be a first-surface set of points in the 3D point cloud, wherein the first-surface set is contiguous and includes the aiming-indicator location, and wherein each point in the first-surface set has a respective unit normal vector that is equal to the aiming-indicator unit normal vector.

8. The method of claim 7, wherein identifying the second surface comprises:
identifying a second-surface point that (i) is adjacent to the first surface and (ii) has a second-surface-point unit normal vector that is normal to the aiming-indicator unit normal vector; and
identifying a surface that includes the second-surface point as being the second surface.

9. The method of claim 8, wherein identifying the extent of the second surface comprises identifying the extent of the second surface to be a second-surface set of points in the 3D point cloud, wherein the second-surface set is contiguous and includes the second-surface point, and wherein each point in the second-surface set has a respective unit normal vector that is equal to the second-surface-point unit normal vector.

10. The method of claim 1, wherein identifying the second surface comprises:
identifying a first edge of the first surface;
identifying multiple candidate second surfaces;
identifying at least one edge of at least one of the identified candidate second surfaces; and
identifying the second surface to be a candidate second surface that has an edge that is coextensive with the identified first edge of the first surface.

11. The method of claim 1, wherein:
one of the first and second colors is orange; and
the other of the first and second colors is either blue or green.

12. The method of claim 1, further comprising:
identifying at least two edges from among the identified first and second surfaces,
wherein displaying at least part of the 3D point cloud comprises displaying the at least two identified edges in a third color different from both the first and second colors.

13. The method of claim 12, wherein each of the first, second, and third colors has a mutual high-contrast relationship with each of the other two of the first, second, and third colors.

14. The method of claim 12, wherein the at least two edges from among the identified first and second surfaces includes two first-surface edges and one second-surface edge that all connect at a common corner of the object.

15. The method of claim 12, wherein the third color is yellow.

16. The method of claim 15, wherein:
one of the first and second colors is orange; and
the other of the first and second colors is either blue or green.

17. The method of claim 1, wherein the first and second colors have a mutual high-contrast relationship.

18. The method of claim 1, wherein displaying a given surface in a given color comprises displaying the extent of the given surface in the given color.

19. The method of claim 1, further comprising:
while displaying, via the user interface, the identified first surface in the first color and the identified second surface in the second color, receiving a data-capture command via the user interface, and responsively storing volumetric data characteristic of the object.

20. A system comprising:
a user interface;
a depth sensor;
a processor; and
data storage containing instructions executable by the processor for causing the system to carry out a set of functions, the set of functions including:
obtaining a three-dimensional (3D) point cloud from the depth sensor when the depth sensor is positioned such that an aiming indicator appears on a first surface of an object;
processing the 3D point cloud to identify an extent of the first surface;
further processing the 3D point cloud to identify a second surface that is adjacent and normal to the first surface, and to identify an extent of the second surface; and
displaying at least part of the 3D point cloud via the user interface, wherein displaying at least part of the 3D point cloud comprises displaying the identified first surface in a first color and the identified second surface in a second color different from the first color.

* * * * *